No. 825,481. PATENTED JULY 10, 1906.
G. H. POND.
CHILD'S FOLDING CARRIAGE.
APPLICATION FILED JAN. 10, 1905.
2 SHEETS—SHEET 1.
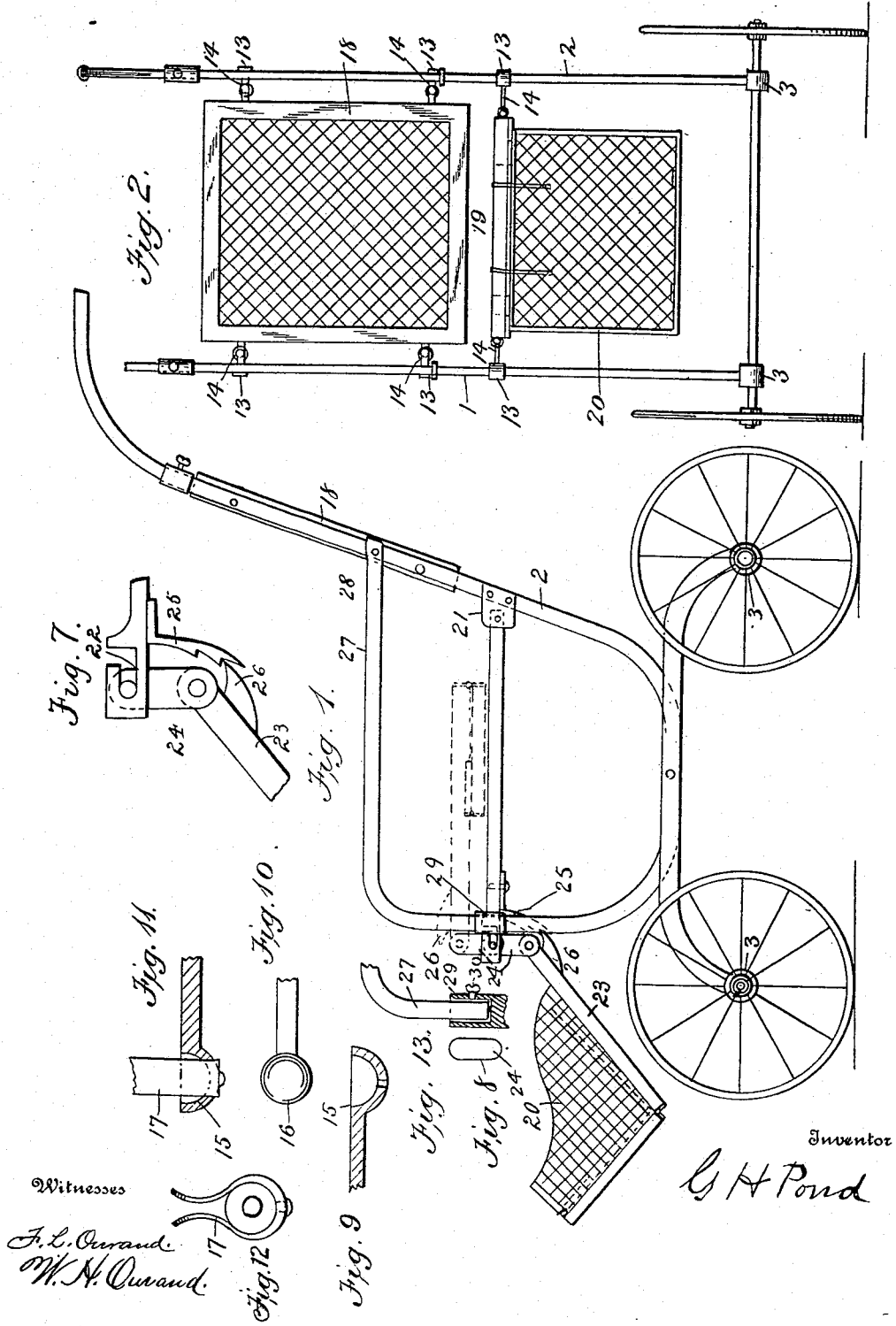
Witnesses
F. L. Ourand.
W. H. Ourand.
Inventor
G H Pond No. 825,481. PATENTED JULY 10, 1906.
G. H. POND.
CHILD'S FOLDING CARRIAGE.
APPLICATION FILED JAN. 10, 1905.
2 SHEETS—SHEET 2.
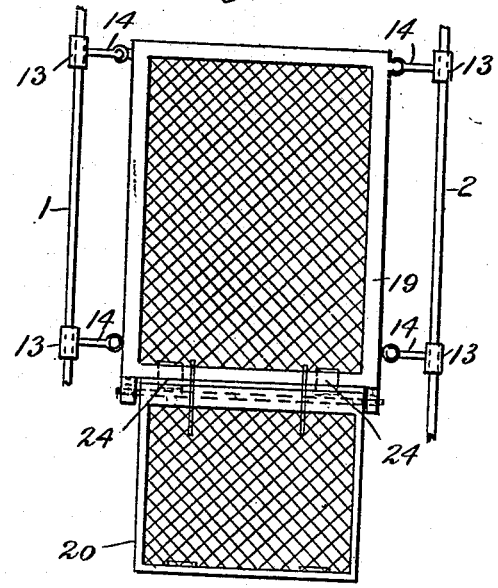
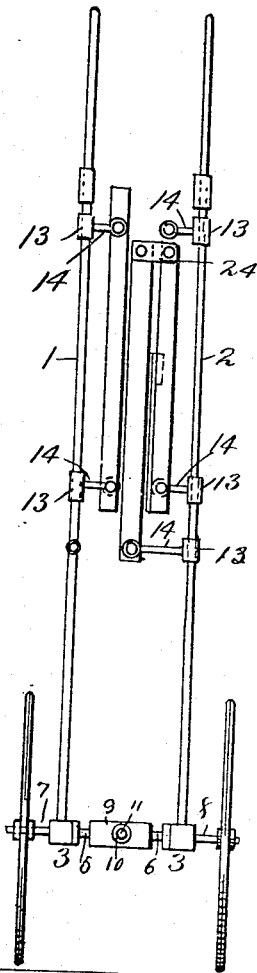
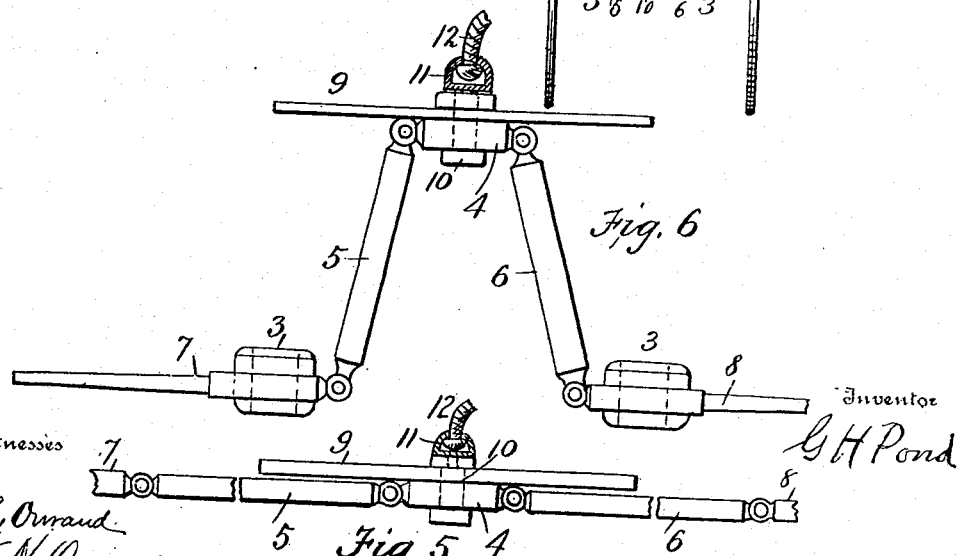
Witnesses
F. L. Ourand
W. N. Ourand
Inventor
G. H. Pond

UNITED STATES PATENT OFFICE.

GOLDSBURY HARDEN POND, OF ASHBURNHAM, MASSACHUSETTS.

CHILD'S FOLDING CARRIAGE.

No. 825,481.      Specification of Letters Patent.      Patented July 10, 1906.

Application filed January 10, 1905. Serial No. 240,408.

*To all whom it may concern:*

Be it known that I, GOLDSBURY HARDEN POND, a citizen of the United States, residing at Ashburnham, in the county of Worcester and State of Massachusetts, have invented new and useful Improvements in Children's Folding Carriages, of which the following is a specification.

My present invention relates to new and useful improvements in children's carriages of the folding type; and the object is to provide a vehicle of the character named which may be readily collapsed to occupy a comparatively small space for storing and transportation and which may be readily extended to permit the various parts or elements to assume their proper relation to adapt the vehicle to the uses for which it is primarily intended.

With the above-mentioned objects in view the invention consists in the novel construction of parts and their aggroupment in operative combination, all as will be hereinafter fully specified and the novelty of which will be particularly pointed out and distinctly claimed.

I have fully and clearly illustrated my invention in the accompanying drawings, to be taken as a part of this specification, and wherein—

Figure 1 is a side elevation of the invention, showing the parts in operative relation with the foot-rest in extended position and indicating in dotted lines its position when folded or turned back. Fig. 2 is a front view of the back and edge view of the seat and front view of the foot-rest in depending position. Fig. 3 is a plan view of the seat and an elevation of the foot-rest. Fig. 4 is a detail view of the frame and component members as in folded or collapsed condition ready for storage or transportation. Fig. 5 is a detail view of the foldable axle extended, showing the stay plate or bar in operative relation thereto. Fig. 6 is a detail front view showing the joints of the axle in the position they assume when the vehicle is folded. Fig. 7 is a detail illustration showing the slot in the side bar of the link connection with the seat-bar and the foot-support. Fig. 8 is a detail view of one of the links or fastenings of the foot-rest which keeps the rest in place when folded back. Figs. 9, 10, 11, and 12 are detail views of the ball-and-socket fastenings and hangings for the back and seat and showing the holding-springs for such connections. Fig. 13 is a detail view of one of the socket connections and set-screw fastenings for the side arms or rails.

Referring to the drawings, 1 2 designate the side bars and handle-bars of the frame, made of suitable material and of such appropriate shape and design as to best suit them for the purposes for which they are intended, said bars being arranged and positioned at a proper elevation and in alinement with each other, substantially as indicated in the drawings, with their lower ends fixedly secured to the outer axle-sections, as at 3, upon which the carrying-wheels are mounted, as best seen in Figs. 4, 5, and 6 of the drawings.

In providing a construction whereby the dimensions of the vehicle-frame may be reduced to occupy a smaller space for the purposes of packing, storage, or transportation I devise means whereby the side portions of the frame may be collapsed upon each other, and this means consists in part of an axle made of a plurality of sections foldable or collapsible upon each other, whereby said axle may be folded to decrease the distance between the carrying-wheels, said axle having associated therewith means to prevent folding movements of the sections when the frame is extended and the vehicle in use. In the drawings I have shown the axle as consisting or made up of a plurality of sections jointed together to open and close in vertical direction, but held against lateral displacement in a horizontal plane, as will be perceived by reference to Figs. 4, 5, and 6 of the drawings, wherein it will be seen the axle comprises a central or middle section 4, to the ends of which are jointed or hinged sections 5 6 of such length as may be determined upon and to the outer ends of which are jointed the sections 7 8, to which the side bars are secured, and which sections last mentioned carry the running wheels in the usual manner.

It is apparent that some means must be provided to prevent the axle from moving downward below horizontality when the vehicle is in use and the axle extended, and I have therefore devised a means for use in this respect which consists of a stay plate or bar 9, secured at its middle to the central section 4 by a clamping-bolt 10 and lying horizontally parallel with the extended sections of the axle, as shown. To a loop 11 or other suitable keeper on the bolt 10 is connected a cord or cable 12, leading to a convenient point for manipulation, whereby the sections of the axle may be made to assume the positions indicated in Fig. 6, or they may be lowered to assume the horizontal relation indicated in Fig. 5, in the former of which the side bars of the frame are brought into closer relation and in the latter said bars are moved to the limit of their outer position when in use.

It will be premised that the back and the seat frames are held in their relative operative positions to the side bars by substantially similar means, which means are so constructed as to permit one, either, or both sides of these elements or members to be detached or disconnected and then turned on a jointed or pivotal connection to stand edgewise between the side bars, as seen in Fig. 4 of the drawings. To properly provide this pivotal connection and to make the parts stand firm, strong, and rigid between the side bars when brought into requisition in use, I attach and connect to the side bars sleeves or supports 13, formed with inwardly-directed arms 14, terminating in circular sockets 15, wherein engage balls 16, on the outer ends or studs or arms fixed to the side rails of the seat and back frames, which balls are held in frictional engagement with the sockets by retaining-spring keepers 17, secured to the socket-pieces, and hold the ball and sockets together, so that either side of the back or seat frame may be detached from the connections and turned on the pivotal supports into vertical position between the side bars. By means of the spring-keepers the engagements of the various parts are insured with that certainty essential to the successful operation of the vehicle when in use.

The back-frame is designated by 18, the seat-frame by 19, and the foot-rest by 20. The seat-frame is detachably pivoted to the side bars of the frame at the desirable or determined points, as at 21, on bearings extending inwardly from the said frame-bars. The side members or bars of the seat-frame are extended at the front and are formed with slotted seats 22, wherein are journaled the ends of the supporting-bar 23 of the end piece of the foot-rest, as indicated in Figs. 1 and 7 of the drawings. The foot-rest 20 is so supported that it may be moved from its bearings and turned back, as indicated in Fig. 1 of the drawings in the dotted lines, to effect which result it is hung to the side bar by links 24. It will be seen that the links permit the foot-rest to be unseated from its bearing and then turned back to lie parallel with the seat. The foot-rest is adjustably mounted on its bearings by means of a stop or ratchet bracket 25, secured to the side bars of the seat, which bracket engages with an extension or arm 26, reaching from the side portion of the foot-rest. The arms 27 are pivotally connected to the side bars, as at 28, and at their forward or free ends engage in sockets 29 in the turned-up ends of the side bars, as indicated in Fig. 13 of the drawings, being detachably held in position at the outer ends by set-screws 30.

To collapse the vehicle, the foot-rest is turned back on the seat, then the detachable bearings or fastenings are disconnected at one side of the seat, and the seat with the foot-rest is turned laterally on the other bearings into vertical position, and then the adjustable arms disconnected from the socket 29, and the sides are raised, bringing the wheels together. The back may then be swung on one set of its supports into vertical position parallel with the seat and foot-rest, and the cord is pulled and the side bars brought into their closest relation which collapses the vehicle into its most compact condition.

Having thus described my invention, what I claim, and desire to secure by Letters Patent, is—

1. In a child's folding-carriage, the combination of a frame comprising independent side bars collapsible upon each other, and a foldable axle carried by said side bars and comprising a central member axle-sections jointed to the opposite ends thereof, and spindle-sections jointed to the outer ends of the axle-sections, the jointed connections of said elements being such that the sections swing in a vertical plane on horizontally-arranged pivotal points, and a stay member rigidly mounted on said central member and having its ends adapted to engage the said axle-section when the axle is extended, to prevent the collapse thereof below a horizontal line.

2. In a child's folding carriage, an axle comprising a plurality of sections jointed together upon horizontally-disposed pivots and a stay-plate rigidly secured on the central section and having its end portions extended beyond the ends of said section to engage on the sections on the opposite sides of said central section to prevent the axle-sections from moving below a horizontal line.

3. In a child's folding carriage, a sectional axle jointed together upon horizontally-disposed pivots to permit the sections to swing on a vertical plane, and a stay-plate secured to the middle section of the axle and engaging the outer sections thereof to hold all the sections in horizontal alinement.

4. In a child's folding carriage, a sectional axle jointed together upon horizontally-disposed pivots to permit the sections to swing in a vertical plane, a stay-plate connected to the middle section of the axle and adapted to engage the adjacent outer sections thereof to prevent all the sections from movement below horizontality, and a cable connected to the middle section to bring the outer sections inwardly and raise the sections jointed to the middle section vertically 5. A child's foldable carriage, comprising a pair of parallel side and handle bars, a back frame detachably pivoted between said bars to swing into vertical position between said bars, a seat-frame detachably pivoted to each of the side bars to swing into vertical position on either of its pivotal supports, a foldable and vertically-adjustable foot-rest detachably hung to the front end of the seat-frame and adapted to turn back thereon, and a sectional axle jointed together and adapted to be retracted and extended lengthwise from the middle, a stay secured to the middle axle-section to prevent the sections from movement below a horizontal line, and means secured to the stay to lift the middle axle-section and swing the adjacent axle-sections vertically and bring the side and handle bars toward each other.

6. The combination of the side bars having upturned forward ends formed with sockets, the side arms having their forward portions turned downward and adapted to engage in the sockets of the side bars.

7. The combination with the side bars and the seat and back frames, of inwardly-directed arms secured to the side bars and formed with circular sockets in their inner ends, balls secured to the side pieces of the seat and back frames to engage in said sockets, and retaining-spring keepers fixed to the socket-pieces to hold the balls in the sockets.

In testimony whereof I affix my signature in presence of two subscribing witnesses.

GOLDSBURY HARDEN POND.

Witnesses:
  A. G. HEYLMUN,
  BURR N. EDWARDS.